(12) United States Patent
Xu et al.

(10) Patent No.: US 10,855,939 B1
(45) Date of Patent: Dec. 1, 2020

(54) STACKED IMAGE SENSOR WITH PROGRAMMABLE EDGE DETECTION FOR HIGH FRAME RATE IMAGING AND AN IMAGING METHOD THEREOF

(71) Applicant: SmartSens Technology (CAYMAN) Co., Ltd, Grand Cayman (KY)

(72) Inventors: Chen Xu, Shanghai (CN); Jin He, Shanghai (CN); Xiaoyong Wang, Shanghai (CN)

(73) Assignee: SmartSens Technology (HK) Co, Limited, Kowloon (HK)

( * ) Notice: Subject to any disclaimer, the term of this patent is extended or adjusted under 35 U.S.C. 154(b) by 0 days.

(21) Appl. No.: 16/581,100

(22) Filed: Sep. 24, 2019

(30) Foreign Application Priority Data

Aug. 29, 2019 (CN) .......................... 2019 1 0806254

(51) Int. Cl.
*H04N 5/341* (2011.01)
*H04N 5/374* (2011.01)
*H04N 5/369* (2011.01)

(52) U.S. Cl.
CPC ............. *H04N 5/341* (2013.01); *H04N 5/374* (2013.01); *H04N 5/379* (2018.08)

(58) Field of Classification Search
CPC ....................................................... H04N 5/341
USPC ........................................................ 348/308
See application file for complete search history.

(56) References Cited

U.S. PATENT DOCUMENTS

| 5,392,365 A * | 2/1995 | Steinkirchner | .... H04N 1/40062 358/462 |
| 6,778,212 B1 * | 8/2004 | Deng | ..................... H04N 5/235 250/208.1 |

* cited by examiner

*Primary Examiner* — Joel W Fosselman
(74) *Attorney, Agent, or Firm* — Eric Karich; Karich & Associates

(57) ABSTRACT

A compact high frame rate image sensing system has a three CMOS semiconductor circuit chip stack formation, and an imaging method thereof. The bottom chip has an array of light sensitive regions and structures to capture an image. The middle chip includes a Static Random Access Memory (SRAM) or a Dynamic Random Access Memory (DRAM) frame buffer circuit. The top chip includes image processing and logic circuit elements to rapidly extract an image or its main characteristics as determined by a boundary detecting filter block. The image sensing system also includes a compiling tool to provide the programming parameters to the programmable filter blocks in order to optimize the image sensing system for a specific motion detection application.

25 Claims, 8 Drawing Sheets

| 1 | 0 | 0 | 1 |
|---|---|---|---|
| 1 | 0 | 1 | 1 |
| 0 | 1 | 1 | 0 |
| 1 | 0 | 1 | 1 |
| 0 | 1 | 1 | 0 |

*Fig. 4*

STACKED IMAGE SENSOR WITH PROGRAMMABLE EDGE DETECTION FOR HIGH FRAME RATE IMAGING AND AN IMAGING METHOD THEREOF

BACKGROUND OF THE INVENTION

Field of the Invention

This invention relates generally to image sensors, and more particularly to CMOS image sensors in a three semiconductor circuit chip stack formation. The bottom chip includes an array of light sensitive regions and structures to capture an image. The middle chip includes a digital data memory such as a Static Random Access Memory (SRAM) or a Dynamic Random Access Memory (DRAM) frame buffer circuit. The top chip includes image processing and logic circuit elements to rapidly extract an image or its main characteristics as determined by a boundary detecting filter block. The image sensor may be incorporated within a digital camera.

Description of Related Art

An image capture device includes an image sensor and an imaging lens. The imaging lens focuses light onto the image sensor to form an image, and the image sensor converts the light into electrical signals. The electrical signals are output from the image capture device to other components of a host electronic system. The image capture device and the other components of a host electronic system form an image sensor system or imaging system. Image sensors have become ubiquitous and may be found in a variety of electronic systems, for example a mobile device, a digital camera, a medical device, or a computer.

A typical image sensor comprises a number of light sensitive picture elements ("pixels") arranged in a two-dimensional array. Such an image sensor may be configured to produce a color image by forming a color filter array (CFA) over the pixels. The technology used to manufacture image sensors, and in particular, complementary metal-oxide-semiconductor ("CMOS") image sensors, has continued to advance at great pace. For example, the demands of higher resolution and lower power consumption have encouraged the further miniaturization and integration of these image sensors. However, miniaturization has come with the loss of pixel photosensitivity and dynamic range which require new approaches in order to mitigate.

With the decreased pixel size, the total light absorption depth within the substrate becomes insufficient for some light, especially long-wavelength light. This becomes a particular problem for image sensors using backside illumination (BSI) technology wherein the image light is incident upon the backside of the sensor substrate. In BSI technology the sensor silicon substrate may be only two microns (micrometers) thick, which is adequate to absorb blue light, but very inadequate to absorb red light, which may require ten microns of thickness to be fully absorbed.

It is known to form a given image sensor as a so-called stacked image sensor. In a typical arrangement of this type, photodiodes or other light sensitive elements of the pixel array are formed in a first semiconductor die or substrate, while associated readout circuitry for processing signals from the photosensitive elements is formed in a second semiconductor die or substrate that directly overlies the first semiconductor die or substrate. These first and second semiconductor die or substrates are more generally referred to herein as sensor and circuit chips, respectively. More precisely, the first and second semiconductor die are formed alongside many other like die on the first and second semiconductor wafers which are stacked, after aligning associated inter-wafer electrical interconnects, and diced or cut into a stacked assembly of what are commonly called semiconductor chips. In the image sensing system claimed in the present disclosure the light sensitive elements and the readout circuitry occupy the same substrate. When reference is made to stacking two chips it is understood that in one common practice two wafers are stacked and diced into chips that remain stacked to form an electrical system such as a stacked image sensor. It is however possible to stack individual chips taken from a first wafer onto other chips still in wafer form or even to stack two chips. Also, the inter-wafer electrical interconnects coupling the sensor and circuit wafers may be referred to as inter-chip interconnects while intra-wafer interconnects and intra-chip interconnects refer to interconnections formed among devices residing on the same wafer and chip respectively. An advantage associated with this arrangement includes that the resulting image sensor system occupies a reduced area compared with not-stacked arrangements. An additional advantage is that different manufacturing methods and materials may be used to fabricate each chip, allowing independent optimizations to be employed.

Two of the most common methods for reading off the image signals generated on a sensor chip are the rolling shutter mode and the global shutter mode. The rolling shutter mode involves exposing different lines of the sensor array at different times and reading out those lines in a chosen sequence. The global shutter mode involves exposing each pixel simultaneously and for the same length of time similar to how a mechanical shutter operates on a legacy "snapshot" camera. Prior art digital imaging systems have utilized either rolling shutter or global shutter readout modes. There are advantages however to having an imaging system which is capable of both readout modes wherein the readout mode is selectable by the operator.

Rolling shutter (RS) mode exposes and reads out adjacent rows of the array at different times, that is, each row will start and end its exposure slightly offset in time from its neighbor. The readout of each row follows along each row after the exposure has been completed and transfers the charge from each row into the readout node of the pixel. Although each row is subject to the same exposure time, the row at the top will have ended its exposure a certain time prior to the end of the exposure of the bottom row of the sensor. That time depends on the number of rows and the offset in time between adjacent rows. A potential disadvantage of rolling shutter readout mode is spatial distortion which results from the above. The distortion becomes more apparent in cases where larger objects are moving at a rate that is faster than the readout rate. Another disadvantage is that different regions of the exposed image will not be precisely correlated in time and appear as a distortion in the image. To improve signal to noise in the image signal final readout, specifically to reduce temporal dark noise, a reference readout called correlated double sampling (CDS) is performed prior to the conversion of each pixel charge to an output signal by an amplifier transistor. The amplifier transistor may typically be a transistor in a source-follower (SF) configuration.

Global shutter (GS) mode exposes all pixels of the array simultaneously. This facilitates the capture of fast moving events, freezing them in time. Before the exposure begins all the pixels are reset (RST) to the same ostensibly dark level by draining all their charge. At the start of the exposure each pixel begins simultaneously to collect charge and is allowed to do so for the duration of the exposure time. At the end of the exposure each pixel transfers charge simultaneously to its readout node. Global shutter mode can be configured to operate in a continuous manner whereby an exposure can proceed while the previous exposure is being readout from the readout storage nodes of each pixel. In this mode the sensor has 100% duty cycle which optimizes time resolution and photon collection efficiency. There is no artifact in the image of the period of transient readout that occurs in rolling shutter mode. Global shutter can be regarded as essential when exact time correlation is required between different regions of the sensor area. Global shutter is also very simple to synchronize with light sources or other devices.

Global shutter mode demands that a pixel contain at least one more transistor or storage component than a pixel using rolling shutter mode. Those extra components are used to store the image charge for readout during the time period following simultaneous exposure. Again in order to improve signal to noise in the image signal a reference readout is required not only to be performed prior to the conversion of each pixel charge to an output signal by an amplifier transistor but also prior to the transfer of the pixel charge to the extra components of the pixel used to store the image charge during readout.

In summary, rolling shutter can deliver the lowest read noise and is useful for very fast streaming of data without synchronization to light sources or peripheral devices. However it carries risk of spatial distortion especially when imaging relatively large, fast moving objects. There is no risk of spatial distortion when using global shutter and when synchronizing to fast switching peripheral devices it is relatively simple and can result in faster frame rates. Flexibility to offer both rolling shutter and global shutter can be very advantageous.

Real-time image processing is difficult to achieve. This is due to several factors such as the large data set represented by an image and the complex operations which may need to be performed on the image. At real-time video rates of 30 frames per second, a single operation performed on every pixel of a color image can equate to tens of millions of operations per second. Many image processing applications require that several operations be performed on each pixel in the image resulting in an even larger number of required operations per second.

Typically an image signal processor (ISP) is implemented within the imaging system for this purpose. It provides demosaicing to determine which color each pixel represents and to interpolate regions at and near pixels. It also may control autofocus, exposure, and white balance for the imaging system. Recently, correcting for lens imperfections like vignetting or color shading imparted by the imperfect lens system has been added, along with features like HDR recombining, noise reduction, face/object detection, and other filters. ISP may also provide focus assembly control if needed. The ISP may be included onboard the circuit wafer or as an added discrete chip. ISPs typically have an embedded CPU to execute its required functions. Most modern signal processors have little or no reconfigurability and often must be redesigned and manufactured for each application change.

One alternative is to use a field programmable gate array (FPGA) as an implementation platform for the desired image processing and imager control functions, particularly real-time video processing. An FPGA consists of a matrix of logic blocks that are connected by a switching network. Both the logic blocks and the switching network are reprogrammable, allowing application-specific hardware to be constructed, while at the same time maintaining the ability to change the functionality of the system with ease. As such, an FPGA offers a compromise between the flexibility of general purpose processors and the hardware-based speed of application specific circuits (ASICs). An FPGA also offers performance gains due to its capability to perform parallel processing as compared to the serial processing provided by many image signal processor (ISP) circuits. In addition to signal processing functions, an FPGA may also provide control circuit and input/output (I/O) circuit configurability.

Increasing the high frame rate capability of stacked image sensors may improve real time image processing when certain novel circuit elements are employed along with edge recognition filters that may be optimized by on-chip programmability. The present invention fulfills these needs and provides further advantages as described in the following summary.

SUMMARY OF THE INVENTION

The present invention teaches certain benefits in construction and use which give rise to the objectives described below.

An image sensor has among its components a pixel cell that has a photodiode, a transfer transistor, a source follower amplifier transistor, and a readout circuit. The photodiode, transfer transistor, source follower amplifier transistor and reset transistor are disposed within a first substrate of a first semiconductor chip for accumulating an image charge in response to light incident upon the photodiode. The readout circuit block may also be disposed within the first substrate. The first substrate may also include a memory interface which would allow the image sensor to be directly coupled to a memory interface port of a standard memory, for example, a DRAM memory or an SRAM memory. A second substrate may be stacked on the image sensor substrate and include a standard or customized memory circuit, such as a DRAM or SRAM memory chip connected to the image sensor on the first substrate. A third substrate may be stacked on the opposite side of the memory circuit substrate and disposed within the third substrate. Certain other circuits useful in image processing may be included, such as FPGA, I/O, PLL and ISP circuit blocks.

A primary objective of the present invention is to provide an image sensor with a pixel cell having advantages not taught by the prior art.

Another objective is to provide an image sensor with a pixel cell that occupies less area and may thereby reduce pixel array size and manufacturing cost.

An additional objective of the present is to provide an image sensor with a stacked pixel having readout modes that operate at very high frame rates through the use of computer programmable digital register settings applied to image processing filters and the use of single bit edge or boundary extraction techniques.

Another objective of the present invention is to provide an image sensor with a frame memory stacked on it to allow more rapid capture and hold of an image frame within the memory to allow image feature detection filters to be applied to the frame while a subsequent image frame is being collected.

Another objective of the present invention is to provide an image sensor system incorporating designated trigger regions within the imaging array in order to more rapidly identify objects moving into a scene and transmit an edge or boundary defined image rapidly.

Another objective of the present invention is to provide an image sensor system imaging method that includes at least one specific triggering region within the imaging array in order to more rapidly identify objects moving into a scene and transmit an edge or boundary defined image.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings:

FIG. 4 is a diagram illustrating one example of single-bit image data output by an edge or boundary detecting filter in an image sensor system according to an embodiment of the present invention;

DETAILED DESCRIPTION OF THE INVENTION

The above-described drawing figures illustrate the invention, a compact high frame rate image sensing system with a field programmable image feature edge or boundary detecting filter block. Various embodiments of the stacked image sensor system are disclosed herein. In the following description, numerous specific details are set forth in order to provide a thorough understanding of the present invention. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects. A substrate may have a front side and a back side. Any fabrication process that is performed from the front side may be referred to as a frontside process while any fabrication process that is performed from the back side may be referred to as a backside process. Structures and devices such as photodiodes and associated transistors may be formed in a front surface of a substrate. A dielectric stack that includes alternating layers of metal routing layers and conductive via layers may be formed on the front surface of a substrate.

The terms "coupled" and "connected", which are utilized herein, are defined as follows. The term "connected" is used to describe a direct connection between two circuit elements, for example, by way of a metal line formed in accordance with normal integrated circuit fabrication techniques. In contrast, the term "coupled" is used to describe either a direct connection or an indirect connection between two circuit elements. For example, two coupled elements may be directly coupled by way of a metal line, or indirectly connected by way of an intervening circuit element (e.g., a capacitor, resistor, or by way of the source/drain terminals of a transistor). In the present invention of a stacked chip arrangement the front sides of two chips may be directly connected since the electrical interconnects on each chip will most commonly be formed on the front sides of each chip. When reference is made to certain circuit elements residing within or formed in a substrate this is generally accepted to mean the circuits reside on the front side of the substrate.

Figure 1:
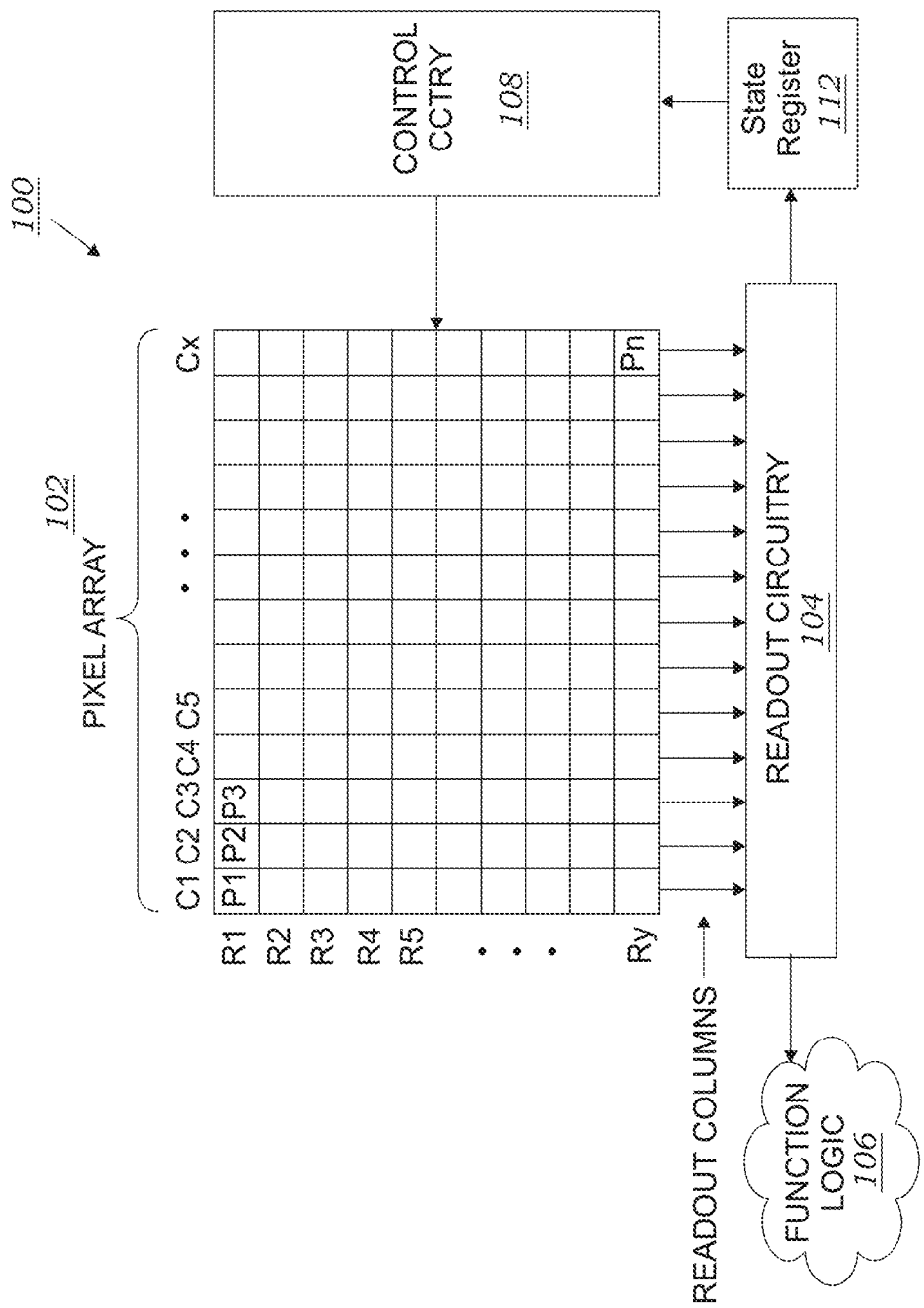
FIG. 1 is a diagram illustrating one example of an imaging system including a pixel array having stacked image sensor pixel cells included in an integrated circuit system, according to one embodiment of the present invention.

FIG. 1 is a diagram illustrating one example of an imaging system 100 including an example pixel array 102 having a plurality of image sensor pixels included in an example integrated circuit system with features in accordance with the teachings of the present invention. As shown in the depicted example, imaging system 100 includes pixel array 102 coupled to control circuitry 108 and readout circuitry 104, which is coupled to function logic 106. Control circuitry 108 and readout circuitry 104 are in addition coupled to state register 110. In one example, pixel array 102 is a two-dimensional (2D) array of image sensor pixels (e.g., pixels P1, P2 . . . , Pn). As illustrated, each pixel is arranged into a row (e.g., rows R1 to Ry) and a column (e.g., column C1 to Cx) to acquire image data of a person, place, object, etc., which can then be used to render a 2D image of the person, place, object, etc. In one example, after each pixel has acquired its image data or image charge, the image data is readout by readout circuitry 104 using a readout mode specified by state register 112 and then transferred to function logic 106. In various examples, readout circuitry 104 may include amplification circuitry, analog-to-digital (ADC) conversion circuitry, or otherwise. State register 112 may include a digitally programmed selection system to determine whether readout mode is by rolling shutter or global shutter. Function logic 106 may simply store the image data or even manipulate the image data by applying post image effects (e.g., crop, rotate, remove red eye, adjust brightness, adjust contrast, or otherwise). In one example, readout circuitry 104 may readout a row of image data at a time along readout column lines (illustrated) or may readout the image data using a variety of other techniques (not illustrated), such as a serial readout or a full parallel readout of all pixels simultaneously. In one example, control circuitry 108 is coupled to pixel array 102 to control operational characteristics of pixel array 102. Some aspects of the operation of control circuitry 108 may be determined by settings present in state register 112. For example, control circuitry 108 may generate a shutter signal for controlling image acquisition. In one example, the shutter signal is a global shutter signal for simultaneously enabling all pixels within pixel array 102 to simultaneously capture their respective image data during a single acquisition window. In another example, the shutter signal is a rolling shutter signal such that each row, column, or group of pixels is sequentially enabled during consecutive acquisition windows.

Figure 2:
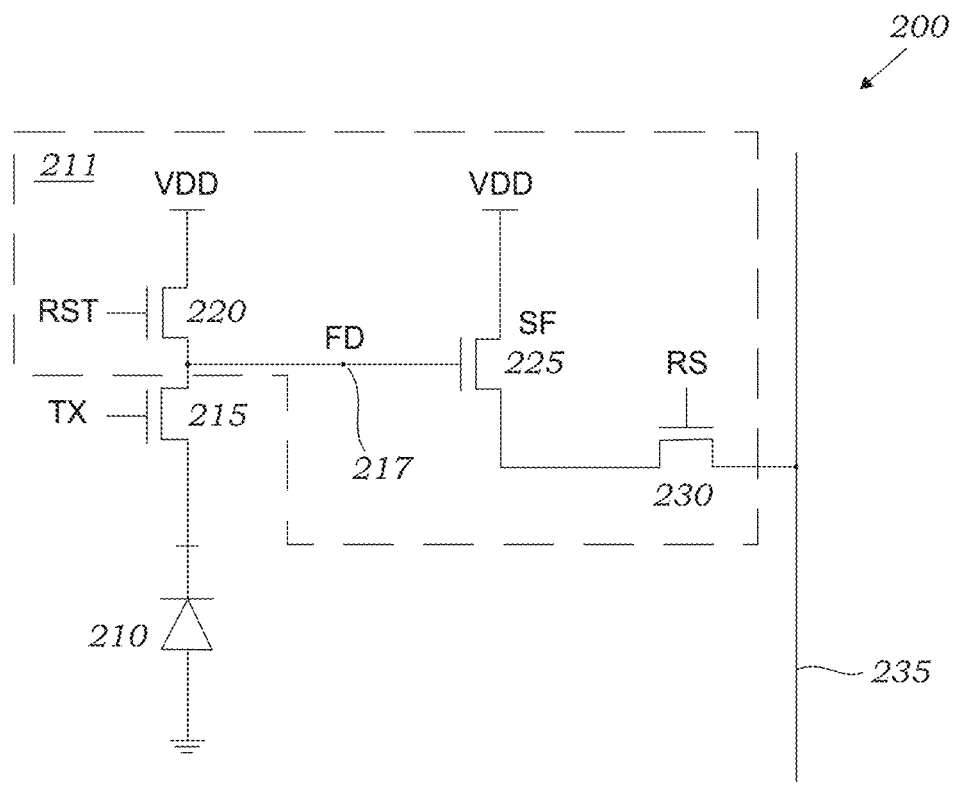
FIG. 2 is an electrical schematic that illustrates one example of a stacked image sensor pixel cell with rolling shutter readout found in the prior art.

FIG. 2 is an electrical schematic that illustrates one example of an image sensor pixel cell 200 with rolling shutter readout found in the prior art. This figure and example pixel are provided to simplify explanation of pixel operation in anticipation of a description of an example of the present invention. Each sensor pixel 200 includes a photodiode 210 (e.g., photosensitive element) and pixel support circuitry 211 as shown. Photodiode 210 may be a "pinned" photodiode as is commonly present in CMOS image sensors. Photodiode 210 and pixel support circuitry 211 may be disposed on a sensor chip of a stacked die system. In the example of FIG. 2, pixel support circuitry 211 includes a reset transistor 220, source follower (SF) amplifier transistor 225, and row select transistor 230 on a circuit chip coupled to a transfer transistor 215 and photodiode 210 on a sensor chip as shown. An amplifier transistor in a source follower configuration is one in which the signal is input on the gate electrode and taken out on the source electrode. In another example, not shown, pixel support circuitry 211 includes row select transistor 230 coupled to a reset transistor 220, source follower (SF) transistor 225, transfer transistor 215, and photodiode 210 on a sensor chip of a stacked die system. During operation, photosensitive element 210 photo-generates charge in response to incident light during an exposure period. Transfer transistor 215 is coupled to receive a transfer signal TX, which causes transfer transistor 215 to transfer the charge accumulated in photodiode 210 to floating diode (FD) node 217. Floating diode 217 is in effect the drain of the transfer transistor 215 while the photodiode 210 is the source of transfer transistor 215. In one embodiment, transfer transistor 215 is a metal-oxide semiconductor field-effect transistor (MOSFET). Reset transistor 220 is coupled between power rail VDD and floating diode node 217 to reset sensor pixel 200 (e.g., discharge or charge floating diode node 217 and photodiode 210 to a preset voltage) in response to a reset signal RST. Floating diode node 217 is coupled to control the gate terminal of source-follower transistor 225. Source-follower transistor 225 is coupled between power rail VDD and row select transistor 230 to amplify a signal responsive to the charge on the floating diode FD node 217. Row select transistor 230 couples the output of pixel circuitry from the source-follower transistor 225 to the readout column, or bit line 235, in response to a row select signal RS. Photodiode 210 and floating diode FD node 217 are reset by temporarily asserting or enabling the reset signal RST and transfer signal TX. The accumulation period or accumulating window (i.e., exposure period) begins when the transfer signal TX is disabled, which permits incident light to photo-generate charge in photodiode 210. As photo-generated electrons accumulate in photodiode 210, its voltage decreases (electrons are negative charge carriers). The voltage or charge on photodiode 210 is representative of the intensity of the light incident on photodiode 210 during the exposure period. At the end of the exposure period, the reset signal RST is disabled, which turns off the reset transistor 220 and isolates floating diode FD node 217 from VDD. The transfer signal TX is then enabled to couple photodiode 210 to floating diode FD node 217. The charge is transferred from photodiode 210 to the floating diode FD node 217 through transfer transistor 215 which causes the voltage of floating diode FD node 217 to drop by an amount proportional to photo-generated electrons accumulated on photodiode 210 during the exposure period. The accumulation period or exposure window actually ends when the transfer transistor 215 is disabled, since the photodiode 210 is still accumulating charge while the transfer transistor 215 is enabled and transferring charge to the floating diode FD node 217.

There are many important applications of a modern image sensing system that require the taking of images of fast moving objects without distortion. Example applications include autonomous vehicles, fast robots, and unmanned aerial vehicles. Video based artificial intelligence (AI) applications may be included as well. However, because pixel data are read out one pixel at a time from the image sensor, sensor readout can be undesirably slow, particularly for large image arrays. The speed of the conventional digital imaging system is limited by the pixel transmission rate of the pixel data bus and the pixel data bus becomes the data transmission bottleneck leading to high latency and limited frame rate. This is especially an issue when pixel signals are converted and output as 10-bit and 12-bit high dynamic range signals. A further limitation is that it is difficult to change the pixel access pattern without stopping the normal full field pixel array readout since the image sensor exports pixel data according to a preloaded pixel access pattern and the access pattern cannot be changed readily without first stopping the readout. The disclosed compact image sensing system addresses high latency.

Figure 3:
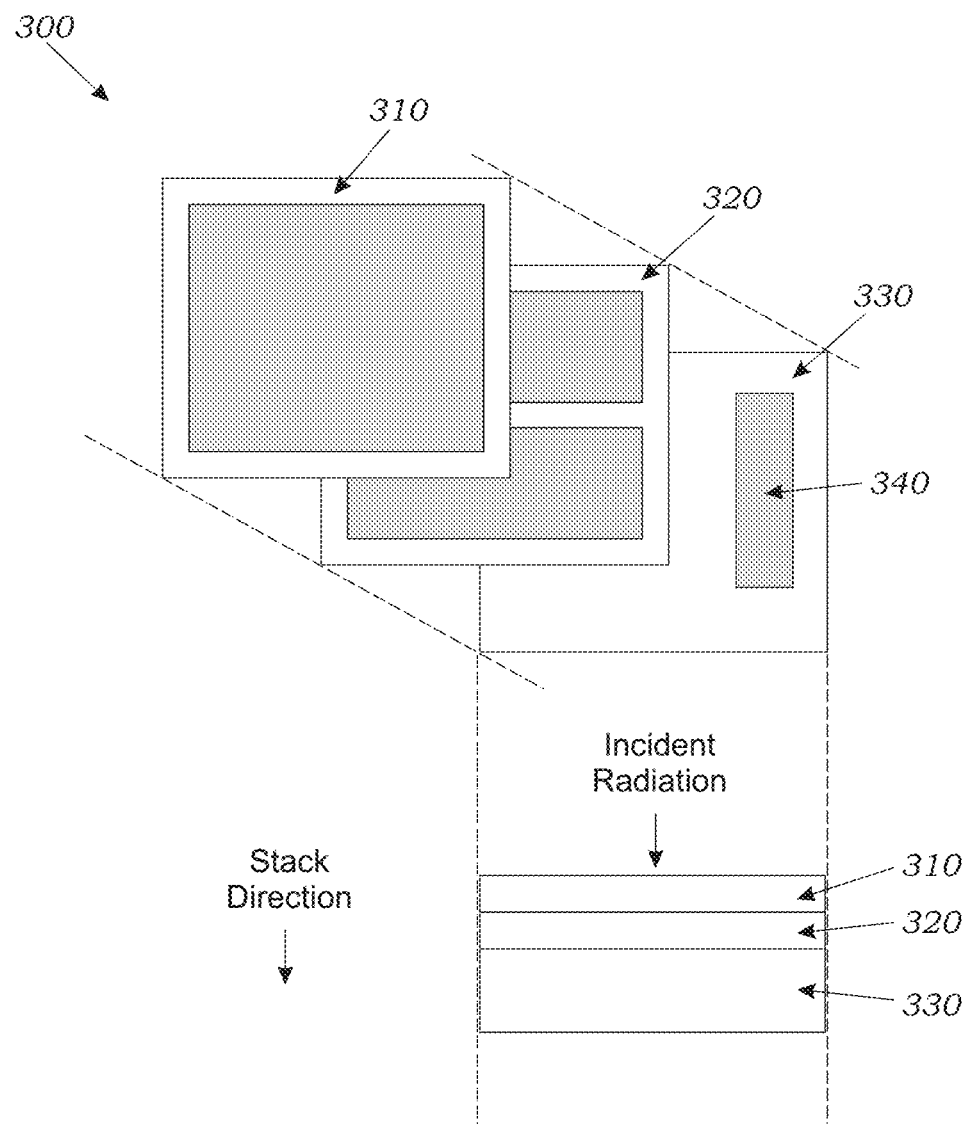
FIG. 3 is a diagram illustrating one example of an imaging system including a pixel array having stacked image sensor chip, digital data memory chip and image processing and logic chip according to one embodiment of the present invention.

FIG. 3 illustrates an image sensor system 300 in accordance with a first embodiment of the invention and comprising a three chip stack of semiconductor integrated circuits including an image sensor array and control circuits chip 310, digital data memory chip 320, and an image processing and logic chip 330. The image sensor array and control circuits chip 310 may be a backside illuminated (BSI) image sensor wherein the image being captured is incident on the backside of the substrate of the image sensor. The stacking direction is downward in the illustration. The digital data memory chip 320 is stacked on the frontside of image sensor array and control circuits chip 310. It may be stacked with its front or circuit side facing the frontside of the image sensor chip or its backside facing the frontside of the image sensor chip. The image processing and logic chip 330 is stacked on top of digital data memory chip 320 with its frontside or circuit side facing data memory chip 320. The stacked chip arrangement allows the image sensing system 300 to be compact and in many cases the stacked system occupied area will be limited by the area of the image sensing array. The close proximity of the data memory chip to the image sensor chip allows direct coupling between them and facilitates high speed pixel readout by alleviating the data transmission bottleneck associated with the use of a remote memory. The digital data memory chip may store at least one frame of image data from image sensor array and control circuits chip 310 and it may store at least temporarily pixel signals of a plurality of frames. Digital data memory chip 320 may be a DRAM or an SRAM or any other memory capable of storing at least one frame of digitized image signal data. In one embodiment digital data memory chip 320 may have a single port or dual port memory interface. In another embodiment a single port or dual port memory interface may be included on image sensor array and control circuits chip 310. In yet another embodiment the data memory chip may include row drivers for the image sensor chip in order to further reduce the image sensor chip area. In any case the stacked chip image sensor system 300 allows for a compact single component wherein the close and direct coupling of the image sensor to the data memory and signal processor chips and facilitates high speed pixel readout between image sensor and image processing devices.

Image processing and logic chip 330 executes various kinds of signal processing, such as filtering, for the pixel signals stored in the memory chip or it may execute signal processing on pixel signals that come directly from the image sensor chip. In that way the image sensing system 300 may provide high frame rate imaging or low frame rate imaging and the ability to rapidly switch from one to the other. A key feature of the signal processing chip is an on-chip programmable reconfiguration circuit 340 that allows filter parameters, for example, to be changed through the use of an off chip compiler. Edge or motion extraction filters such as Isotropic Sobel, Roberts, Prewitt, Laplacian, and/or Canny can be applied to the image data by appropriate modifications to filter parameters through the use of on-chip programmable reconfiguration circuit 340. When motion detection is a primary application, the use of edge detection based on single bit representation of image data may dramatically increase high frame rate capability as well as reduce image processing time and power consumption. Programmable reconfiguration circuit 340 may be an edge or boundary detecting filter block, and programming parameters may enable the filter block to extract a single-bit map representation of multi-bit data stored in digital data memory chip 320.

Figure 4:
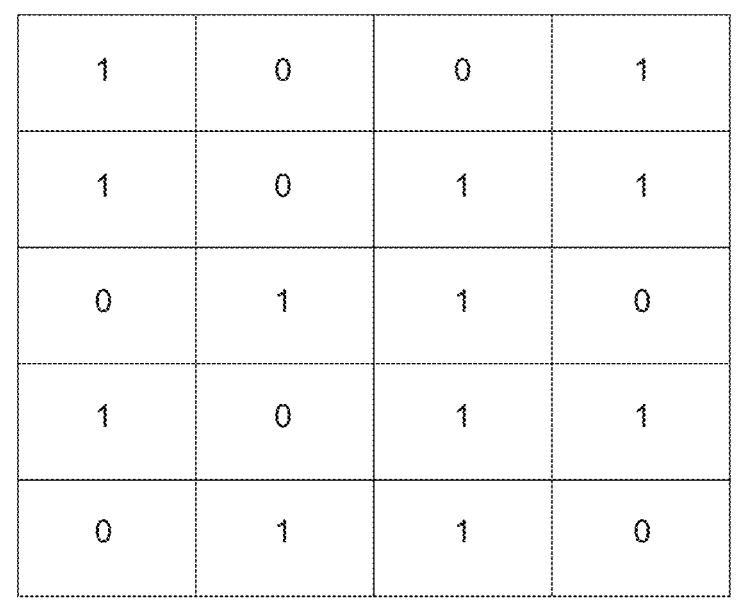

FIG. 4 is a schematic diagram of single bit image data output by an edge or boundary detection filter in the image sensor system 300 of the present invention. In one embodiment, the edge or boundary detection filter is a 3*3 array, and in other embodiments, the edge or boundary detection filter may be in the form of a 3*5 array or other array. The multi-bit image data includes a plurality of multi-bit pixel data, and the edge or boundary detection filter respectively calculates the plurality of multi-bit pixel data based on the programming parameter, and compares the calculated result values with a threshold value, respectively. According to the comparison result, the edge or boundary detection filter outputs a plurality of single-bit pixel data, and the combination of the plurality of single-bit pixel data constitutes the single-bit image data. In one embodiment, when the result value of the multi-bit pixel data calculated by the edge or boundary detection filter is greater than the threshold value, the corresponding single-bit pixel data is "1", and the mapping represents a first feature of the multi-bit pixel data. When the result value of the multi-bit pixel data calculated by the edge or boundary detection filter is less than the threshold value, the corresponding single-bit pixel data is "0", and the mapping represents a second feature of the multi-bit pixel data.

In one embodiment, the invention may include a plurality of edge or boundary detection filters, and after further merging a plurality of single-bit pixel data output by the plurality of the edge or boundary detection filters, a final single-bit pixel data is output again for further image signal processing. In one embodiment, the merging is by voting, for example, two of three the edge or boundary detection filters output "1", and the other one outputs "0", the final single-bit pixel data is merged to be "1". If two of three the edge or boundary detection filters output "0", and the other one outputs p"1", then the final single-bit pixel data is merged to be "0". In another embodiment, the merging is performed by a method that assigning a weight to each edge or boundary detection filter for the final merging and output the final single-bit pixel data. A plurality of the single-bit pixel data constitutes the single-bit image data.

Figure 5:
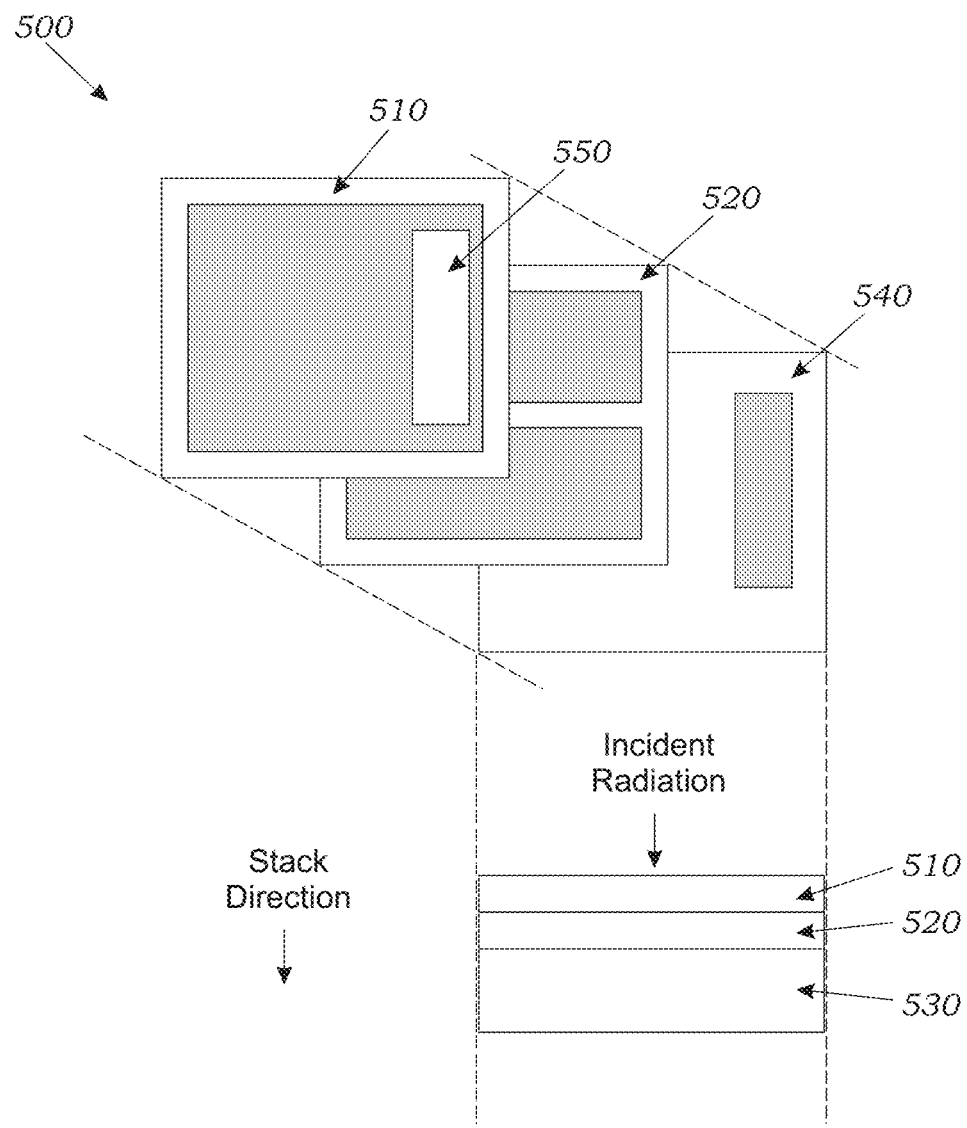
FIG. 5 is a diagram illustrating another example of an imaging system including a pixel array having stacked image sensor chip, digital data memory chip, and image processing and logic chip according to second embodiment of the present invention.

FIG. 5 illustrates an image sensor system 500 in accordance with a second embodiment according to the present invention. The image sensor system 500 comprises three chip stack illustrated in FIG. 3 but with one or more trigger regions 550 defined in an image sensor array and control circuits chip 510. The trigger region 550 is a region of special interest which become identified by the application of the image sensor system 500. For example, if the image sensor system 500 is applied to an autonomous vehicle where there is a special concern for pedestrians or bicycles entering the field of view from the right side, the trigger region 550 might be defined on a right side portion of the image sensor array and control circuits chip 510. When an object in motion enters the predefined trigger region 550, an alarm signal may be sent to the image processor 500 for providing an imaging priority of the trigger region 550 and also perhaps switching to a high frame rate mode such as a single-bit filtering mode.

Figure 6:
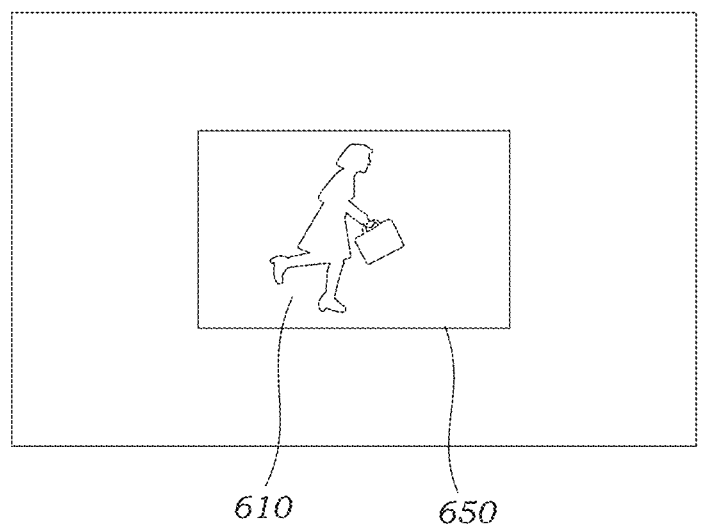
FIG. 6 is a diagram of an image sensor system applied to moving object detection.

FIG. 6 is a schematic diagram of, for example, the image sensor system 500 applied to moving object detection. As shown in FIG. 5-6, in one embodiment, image processing and logic chip 530 of image sensor system 500 quickly determines whether a moving object appears based on multi-bit image data of the preceding and succeeding frames of the image. For example, if a moving object 610 appears, image processing and logic chip 530 further determines whether the moving object 610 enters one or more predetermined trigger regions 650. Region 650 is an example of region 550 of image sensor system 500. When the moving object 610 enters the triggering region 650, image processing and logic chip 530 generates an alarm signal and generates a predefined action based on the alarm signal, for example, the alarm signal is sent to the image sensor array and control circuits chip 510 of image sensor system 500. The image data of the trigger region 650 is preferentially acquired, that is, the image data of the trigger region 650 is preferentially processed to obtain the priority imaging right.

Specifically, the multi-bit image data includes a plurality of multi-bit pixel data. The edge or boundary detection filter is input by an absolute value of subtracting the multi-bit pixel data of the preceding and succeeding frames stored in the digital data memory chip 520. Then the absolute value is calculated by the edge or boundary detection filter based on the programming parameters, and the calculated result value is compared with a threshold value in the edge or boundary detection filter for outputting a single-bit pixel data. A plurality of single-bit pixel data constitutes single-bit image data. In one embodiment, when the calculated result value is greater than the threshold value, the corresponding single-bit pixel data is "1", which may indicates that a moving object appear in the image signal. When the calculated result value is less than the threshold value, the corresponding single-bit pixel data is "0", which may indicates that there is no moving object in the image signal.

Figure 7:
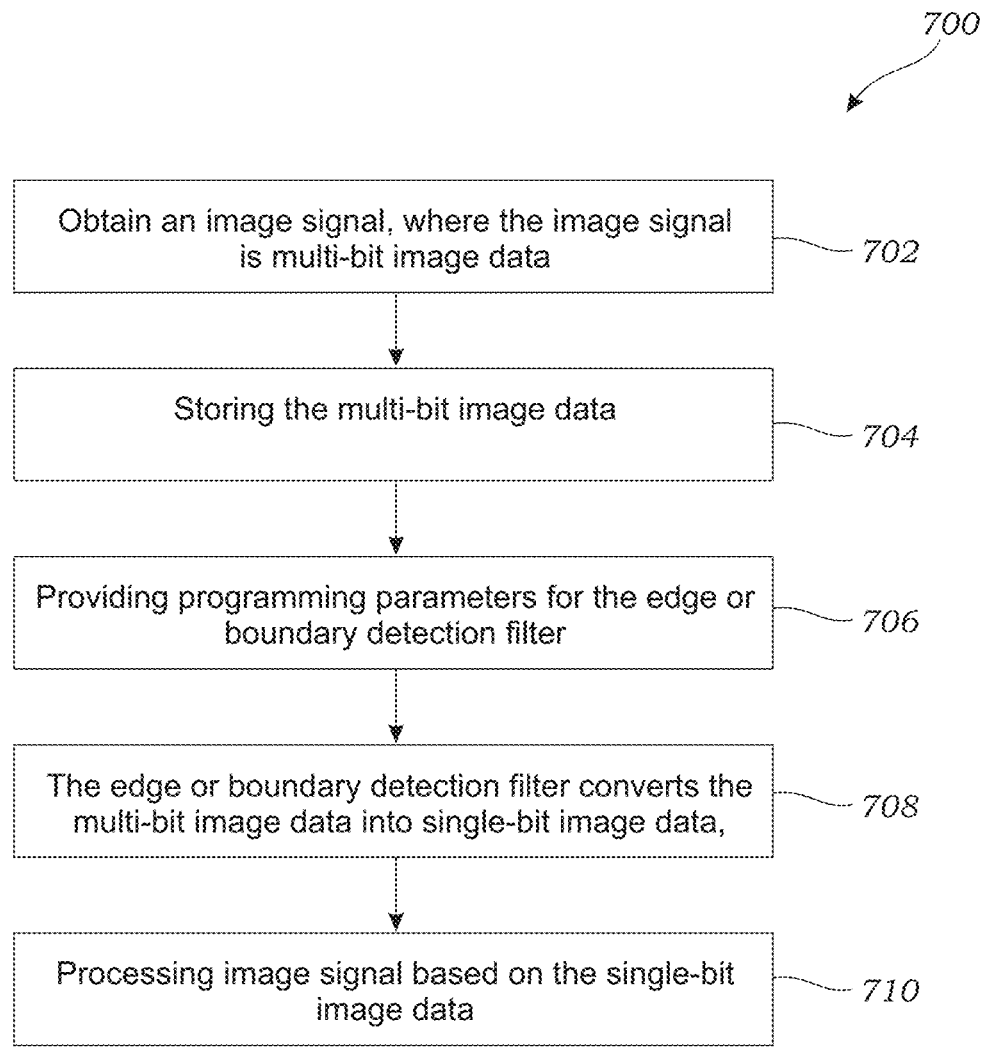
FIG. 7 is a flowchart illustrating one example of a high frame rate imaging method of an image sensor system according to the first embodiment of the present invention.

FIG. 7 shows a flowchart of a high frame rate imaging method 700 in accordance with first embodiment of the present invention, which includes the following steps.

In step 702 the system obtains an image signal, where the image signal is multi-bit image data.

In step 704, the multi-bit image data is stored. In one embodiment, at least one frame of image data may be stored, and the pixel signals of the plurality of frames may be at least temporarily stored to perform various signal processing, such as filtering, on the pixel signals, and in one embodiment, may also be directly.

Step 706 is to provide programming parameters to the edge or boundary detection filter. In one embodiment, filter parameters can be changed by using an off-chip compiler. Edge or motion extraction filters such as Isotropic Sobel, Roberts, Prewitt, Laplacian, and/or Canny can be applied to the image data by appropriate modifications to filter parameters.

In step 708 the edge or boundary detection filter converts the multi-bit image data into single-bit image data, and the single-bit image data map representation of the multi-bit image data.

The multi-bit image data includes a plurality of multi-bit pixel data, the edge or boundary detection filter respectively calculates the plurality of multi-bit pixel data based on the programming parameter. The filter then compares the calculated result values with a threshold value, respectively, and according to the comparison result outputs a plurality of single-bit pixel data. The plurality of single-bit pixel data constitutes single-bit image data. In one embodiment, when the calculated result value of the multi-bit pixel data output from the edge or boundary detection filter is greater than the threshold value, the corresponding single-bit pixel data is "1", and the mapping represents a first feature of the multi-bit pixel data. When the calculated result value of the multi-bit pixel data output from the edge or boundary detection filter is less than the threshold value, the corresponding single-bit pixel data is "0", and the mapping represents a second feature of the multi-bit pixel data.

In one embodiment, the edge or boundary detection filter may be several, and after further merging a plurality of single-bit pixel data output by the plurality of the edge or boundary detection filters, outputting a final single-bit pixel data again for further image signal processing. In one embodiment, the merging is by voting, for example, two of three the edge or boundary detection filters output "1", and the other one outputs "0" the final single-bit pixel data is merged to be "1". If two of three the edge or boundary detection filters output "0", and the other one outputs "1", the final single-bit pixel data is merged to be "0". In another embodiment, the merging is performed by a method that assigning a weight to each edge or boundary detection filter for outputting the final single-bit pixel data. A plurality of single-bit pixel data constitute single-bit image data.

In step 710, the image signal is processed based on the single-bit image data. In this way, the image sensor can provide high frame rate imaging mode or low frame rate imaging mode, as well as the ability to quickly switch from one mode to another.

Figure 8:
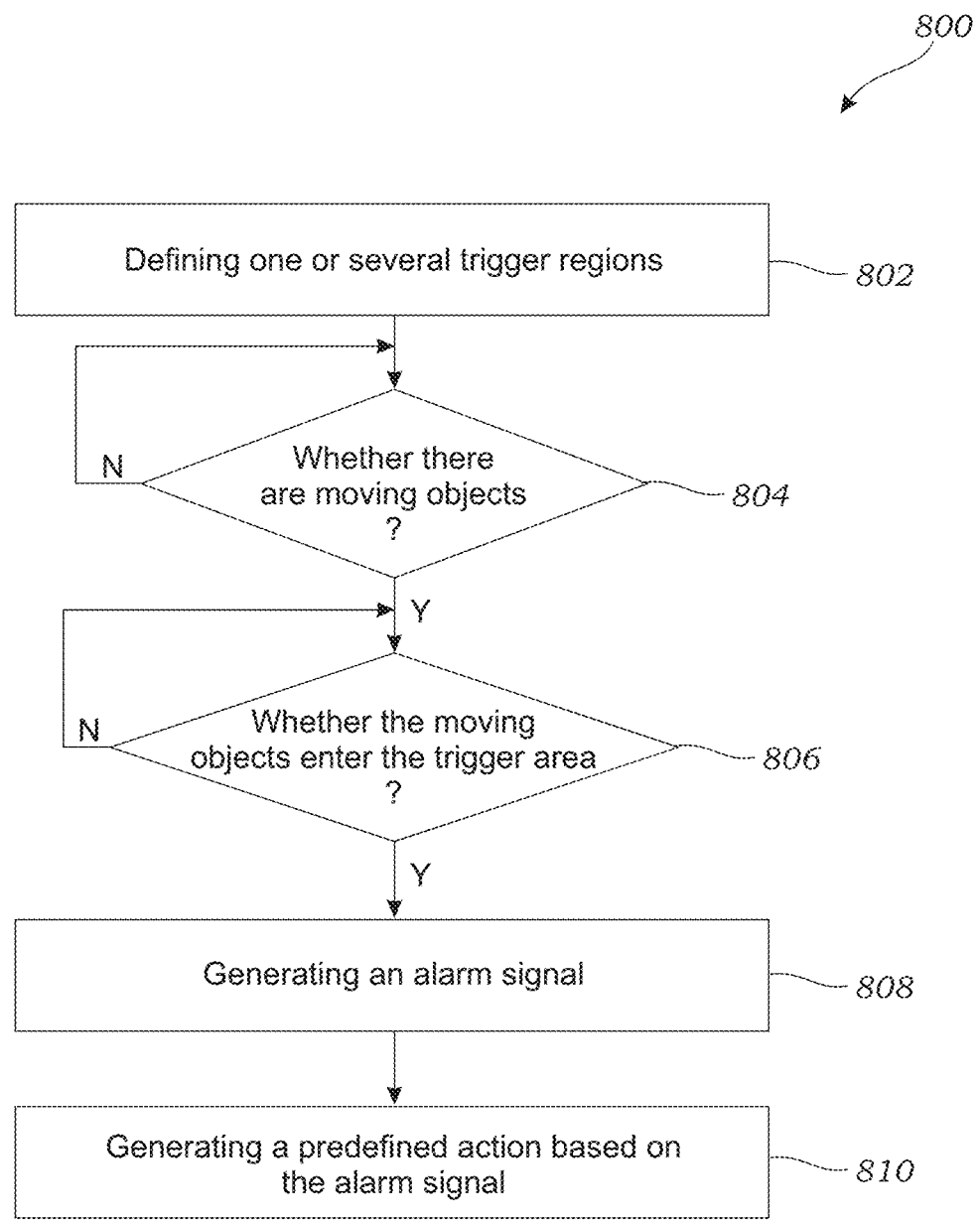
FIG. 8 is a flowchart illustrating another example of a high frame rate imaging method of an image sensor system according to the second embodiment of the present invention.

FIG. 8 shows a flow chart of a high frame rate imaging method 800 in accordance with the second embodiment of the present invention. In contrast to the high frame rate imaging method 700, the following steps are also included.

In step 802, one or several trigger regions are defined. The trigger region is a special region for the interest identified by the image sensor system. For example, if the image sensor system is applied to an autonomous vehicle, it is necessary to pay particular attention to pedestrians or bicycles entering the field of view from the right side, then the triggering region can be defined in the right portion of an image sensor array chip.

Step 804 determines whether there is a moving object based on the multi-bit image data of the preceding and succeeding frames. The multi-bit image data includes a plurality of multi-bit pixel data. In one embodiment, the edge or boundary detection filter is input by absolute values of subtracting the plurality of multi-bit pixel data of the preceding and succeeding frames. Then the absolute values are calculated by the edge or boundary detection filter based on the programming parameters, and each of the calculated result values is compared with a threshold value in the edge or boundary detection filter for outputting a single-bit pixel data. A plurality of single-bit pixel data constitute single-bit image data. In one embodiment, when one of the calculated result values is greater than the threshold value, the corresponding single-bit pixel data is "1", which may indicates that a moving object appear in the image signal. When one of the calculated result values is less than the threshold value, the corresponding single-bit pixel data is "0", which may indicates that there is no moving object in the image signal.

Step 806 determines whether the moving object enters the trigger region. In one embodiment, the image data of the trigger region is subjected to an arithmetic process to determine whether the moving object enters the trigger region.

In step 808, the moving object enters the trigger region and an alarm signal is generated. Step 810 then generates a predefined action based on the alarm signal. In one embodiment, the predefined actions include preferentially acquiring image data of the trigger region for imaging, and switching to a high frame rate mode, such as a single-bit filtering mode. Therefore, when motion detection is the primary application, edge detection using image data based on a single-bit representation can significantly increase the high frame rate capability to reduce image processing time and power consumption.

In summary, the present invention provides an image sensor system and an imaging method thereof which obtain a very high frame rate read mode by using a computer programmable digital register applied to an image processing filter and a single-bit edge or boundary extraction technique. By providing an image sensor on which a data memory is stacked, image frames within the memory can be captured and held more quickly, for allowing image feature detection filters applied to subsequently collected image frames. A specific trigger region is included within the imaging array to quickly identify objects moving into the region and quickly send the images defined by edges or boundaries.

Reference throughout this specification to "one embodiment," "an embodiment," "one example," or "an example" means that a particular feature, structure, or characteristic described in connection with the embodiment or example is included in at least one embodiment or example of the present invention. Thus, the appearances of the phrases such as "in one embodiment" or "in one example" in various places throughout this specification are not necessarily all referring to the same embodiment or example. Furthermore, the particular features, structures, or characteristics may be combined in any suitable manner in one or more embodiments or examples. Directional terminology such as "top", "down", "above", "below" are used with reference to the orientation of the figure(s) being described. Also, the terms "have," "include," "contain," and similar terms are defined to mean "comprising" unless specifically stated otherwise. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

The above description of illustrated examples of the present invention, including what is described in the Abstract, are not intended to be exhaustive or to be limited to the precise forms disclosed. While specific embodiments of, and examples for, the invention are described herein for illustrative purposes, various equivalent modifications are possible without departing from the broader spirit and scope of the present invention. Indeed, it is appreciated that the specific example structures and materials are provided for explanation purposes and that other structures and materials may also be employed in other embodiments and examples in accordance with the teachings of the present invention. These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation.

What is claimed is:

1. A compact high frame rate image sensing system, comprising:
    an image sensor array and control circuits chip for acquiring an imaging signal;
    an image processing and logic chip stacked on and connected to the image sensor array and control circuits chip wherein the image processing and logic chip comprises a field programmable image feature edge or boundary detecting filter block and wherein programming parameters enable the filter block to extract a single-bit image data map representation of multi-bit image data in order to reduce image processing time and power consumption;
    an on-chip programmable reconfiguration circuit to provide the programming parameters to the field programmable image edge or filter block in order to optimize the image sensing system for a specific application; and
    wherein the multi-bit image data comprises a plurality of multi-bit pixel data; the edge or boundary detection filter calculates the plurality of multi-bit pixel data based on the programming parameters, and compares the calculated result values with a threshold value, respectively, and then outputs a plurality of single-bit pixel data according to the comparison result wherein the plurality of single-bit pixel data constitutes the single-bit image data.

2. The image sensing system of claim 1, further comprising a digital data memory chip stacked and coupled between the image sensor array and control circuits chip and the image processing and logic chip for storing the multi-bit image data from the image sensor array and control circuits chip.

3. The image sensing system of claim 2, wherein the digital data memory chip includes one of a Static Random Access Memory (SRAM) or a Dynamic Random Access Memory (DRAM) frame buffer circuit.

4. The image sensing system of claim 2, wherein the image sensor array and control circuits chip includes one of a single port or dual port memory interface.

5. The image sensing system of claim 1, wherein when a result value of the multi-bit pixel data calculated by the edge or boundary detection filter is greater than the threshold value, the corresponding single-bit pixel data is "1" to represent a first feature of the multi-bit pixel data, and when the result value of the multi-bit pixel data operated by the edge or boundary detection filter is less than the threshold value, the single-bit pixel data is "0" to represent a second feature of the multi-bit pixel data.

6. The image sensing system of claim 1, wherein the programming parameters are one of a Sobel, Isotropic Sobel, Roberts, Prewitt, Laplacian, or Canny edge filter.

7. The image sensing system of claim 1, wherein the system is deployed in an autonomous automobile, a robot, an unmanned aerial vehicle, or a machine vision dependent system.

8. The image sensing system of claim 1, wherein the image processing and logic chip may optionally output standard video rate multi-bit per pixel image signals or high frame rate single-bit per image signals.

9. The image sensing system of claim 1, wherein the image sensor array and control circuits chip is a backside illuminated (BSI) image sensor.

10. The image sensing system of claim 1, wherein the image sensor array and control circuits chip is a global shutter readout image sensor.

11. A compact high frame rate image sensing system, comprising:
    an image sensor array and control circuits chip for acquiring an imaging signal;
    an image processing and logic chip stacked on and connected to the image sensor array and control circuits chip wherein the image processing and logic chip comprises a field programmable image feature edge or boundary detecting filter block and wherein programming parameters enable the filter block to extract a single-bit image data map representation of multi-bit image data in order to reduce image processing time and power consumption;
    an on-chip programmable reconfiguration circuit to provide the programming parameters to the field programmable image edge or filter block in order to optimize the image sensing system for a specific application; and
    wherein the image processing and logic chip comprises a plurality of the edge or boundary detection filters, and the image processing and logic chip outputs final merged single-bit image data by a voting or assigning a weight to each of the plurality of the edge or boundary detection filters for further image signal processing.

12. A compact high frame rate image sensing system, comprising:
    an image sensor array and control circuits chip for acquiring an imaging signal;
    an image processing and logic chip stacked on and connected to the image sensor array and control circuits chip wherein the image processing and logic chip comprises a field programmable image feature edge or boundary detecting filter block and wherein programming parameters enable the filter block to extract a single-bit image data map representation of multi-bit image data in order to reduce image processing time and power consumption;
    an on-chip programmable reconfiguration circuit to provide the programming parameters to the field programmable image edge or filter block in order to optimize the image sensing system for a specific application;
    a digital data memory chip stacked and coupled between the image sensor array and control circuits chip and the image processing and logic chip for storing the multi-bit image data from the image sensor array and control circuits chip; and
    wherein one or more trigger regions are defined within the imaging array such that when a moving object enters one of the trigger regions an alert signal is forwarded to the image processing and logic chip causing a predefined action to occur within the image processing and logic chip.

13. The image sensing system of claim 12, wherein the predefined action includes extracting a single-bit representation of the image signal from the trigger region.

14. The image sensing system of claim 13, wherein when one of the calculated result values is greater than the threshold value, the corresponding single-bit pixel data is "1" and when one of the calculated result values is less than the threshold value, the corresponding single-bit pixel data is "0".

15. The image sensing system of claim 12, wherein the multi-bit image data comprises a plurality of multi-bit pixel data; the edge or boundary detection filter is input by absolute values of subtracting the plurality of multi-bit pixel data of the preceding and succeeding frames, and calculates the absolute values based on the programming parameters, and compares each of the calculated result values with a threshold value for outputting a plurality of single-bit pixel data, which constitute the single-bit image data.

16. A compact high frame rate image sensing system, comprising:
an image sensor array and control circuits chip for acquiring an imaging signal;
an image processing and logic chip stacked on and connected to the image sensor array and control circuits chip wherein the image processing and logic chip comprises a field programmable image feature edge or boundary detecting filter block and wherein programming parameters enable the filter block to extract a single-bit image data map representation of multi-bit image data in order to reduce image processing time and power consumption;
an on-chip programmable reconfiguration circuit to provide the programming parameters to the field programmable image edge or filter block in order to optimize the image sensing system for a specific application;
a digital data memory chip stacked and coupled between the image sensor array and control circuits chip and the image processing and logic chip for storing the multi-bit image data from the image sensor array and control circuits chip; and
wherein the row drivers and control circuits supporting the image sensor array and control circuits chip are placed on one of the digital data memory chip or the image processing and logic chip in order to reduce the area of the image sensor chip.

17. A compact high frame rate image sensor system imaging method, the method comprising the steps of:
obtaining an image signal, the image signal being multi-bit image data;
providing programming parameters to an edge or boundary detection filter;
converting by means of the edge or boundary detection filter the multi-bit image data into single-bit image data, and forming a single-bit image data map representing the multi-bit image data;
performing image signal processing based on the single-bit image data; and
wherein the multi-bit image data comprises a plurality of multi-bit pixel data, and the edge or boundary detection filter respectively calculates the plurality of the multi-bit pixel data based on the programming parameters, and the calculated result values are respectively compared with a threshold value for outputting a plurality of single-bit pixel data constituted the single-bit image data.

18. The method of claim 17, further comprising the step of storing the multi-bit image data.

19. The method of claim 17, wherein when a result value of the multi-bit pixel data calculated by the edge or boundary detection filter is greater than a threshold value, the corresponding single-bit pixel data is "1" to represent a first feature of the multi-bit pixel data, and when the result value of the multi-bit pixel data calculated by the edge or boundary detection filter is less than the threshold value, the corresponding single-bit pixel data is "0" to represent a second feature of the multi-bit pixel data.

20. The method of claim 17, wherein the edge or boundary detection filter is one of a Sobel, Isotropic Sobel, Roberts, Prewitt, Laplacian, or Canny edge filter.

21. The method of claim 17, further comprising the steps of: merging the plurality of the single-bit image data output from the plurality of the edge or boundary detection filters by a voting or weighting calculation, and outputting a final single-bit image data for image signal processing.

22. A compact high frame rate image sensor system imaging method, comprising the steps of:
obtaining an image signal, the image signal being multi-bit image data;
providing programming parameters to an edge or boundary detection filter;
converting by means of the edge or boundary detection filter the multi-bit image data into single-bit image data, and forming a single-bit image data map representing the multi-bit image data;
performing image signal processing based on the single-bit image data;
defining one or several trigger regions;
determining whether there is a moving object based on multi-bit image data of the preceding and succeeding frames in the digital data memory chip;
determining whether the moving object enters the trigger region;
generating an alarm signal when the moving object enters the trigger region; and
generating a predefined action based on the alarm signal.

23. The method of claim 22, wherein the predefined action comprises preferentially extracting multi-bit image data or single-bit image data of the trigger region for imaging.

24. The method of claim 22, wherein the multi-bit image data comprises a plurality of multi-bit pixel data; the edge or boundary detection filter is input by absolute values of subtracting the multi-bit pixel data of the preceding and succeeding frames, and calculates the absolute values based on the programming parameters, and compares each of the calculated result values with a threshold value for outputting a plurality of single-bit pixel data, which constitute the single-bit image data.

25. The method of claim 24, wherein when one of the calculated result values is greater than the threshold value, the corresponding single-bit pixel data is "1" and when one of the calculated result values is less than the threshold value, the corresponding single-bit pixel data is "0".

* * * * *